June 17, 1952 L. A. MEACHAM 2,600,561
PULSE MODULATION SYSTEM
Filed May 19, 1949 3 Sheets-Sheet 1

INVENTOR
L. A. MEACHAM
BY: H. A. Burgess
ATTORNEY

INVENTOR
L. A. MEACHAM
BY: H. A. Burgess
ATTORNEY

June 17, 1952

L. A. MEACHAM 2,600,561

PULSE MODULATION SYSTEM

Filed May 19, 1949

3 Sheets-Sheet 3

INVENTOR
L. A. MEACHAM
BY: H. A. Burgess
ATTORNEY

Patented June 17, 1952

2,600,561

UNITED STATES PATENT OFFICE 2,600,561

PULSE MODULATION SYSTEM

Larned A. Meacham, New Providence, N. J., assignor to Bell Telephone Laboratories, Incorporated, New York, N. Y., a corporation of New York Application May 19, 1949, Serial No. 94,081

8 Claims. (Cl. 332—9)

This invention relates to pulse transmission systems and more particularly to quantized systems wherein the input wave form to be transmitted is subjected to instantaneous compression.

It is known that wave forms such as speech current may be transmitted by regularly sampled values without distortion if the sampling rate has a frequency at least twice the highest frequency contained in the wave form. Such sampling is basic to time division multiplex and to the so-called pulse modulation systems, such as, for example, pulse position modulation, pulse length or duration modulation, pulse amplitude modulation and pulse code modulation. It is also known that if the various amplitudes of the wave forms are transmitted in discrete intervals (quanta) rather than continuously varying values, noise and other extraneous signals will not degrade the recovered signal unless the noise amplitudes are sufficiently large to throw the signal from its correct level to another on the quantized scale; this is known as a quantized system.

Quantized systems inherently contain a certain amount of noise known as quantizing noise which is due to the fact that only a finite number of amplitudes are recognized. It is further known that quantizing noise may be reduced by instantaneous compression of the wave form to be sampled. If the total number of recognized discrete intervals remains constant, instantaneous compression results in devoting more of these intervals to low signal levels and fewer of them to the higher levels. Since quantizing noise varies inversely with the number of discrete intervals recognized, the signal-to-noise ratio is improved at the lower levels allowing better transmission of weak signals. The increased noise at the higher levels is found to be relatively unimportant if a proper compression ratio is maintained and if a sufficiently large number of discrete amplitudes are recognized. If before the wave is derived from the samples at the receiver by means of a low-pass filter the amplitude range of the samples is restored by expansion, a replica of the input wave is obtained. Although compression of the input wave increases the frequency range of the wave due to harmonic distortion, it may be shown that the sampling rate and hence frequency band need not be increased. In non-pulse transmission systems, instantaneous compression will usually result in an increase of the band width required for distortionless transmission.

Although quantizing is a fundamental attribute of pulse code modulation because only a finite number of levels can be recognized by a finite code, it is also applicable and beneficial to the other pulse modulation systems.

It is an object of this invention to instantaneously compress a sampled portion of an input wave form and substantially simultaneously produce therefrom a quantized modulated pulse.

It is a further object to produce a system capable of performing such a function wherein the compression ratio and the degree of quantization may easily be varied.

Other objects and features of the invention may be better understood by a consideration of the following detailed description when read in accordance with the attached drawings in which.

Figure 1:
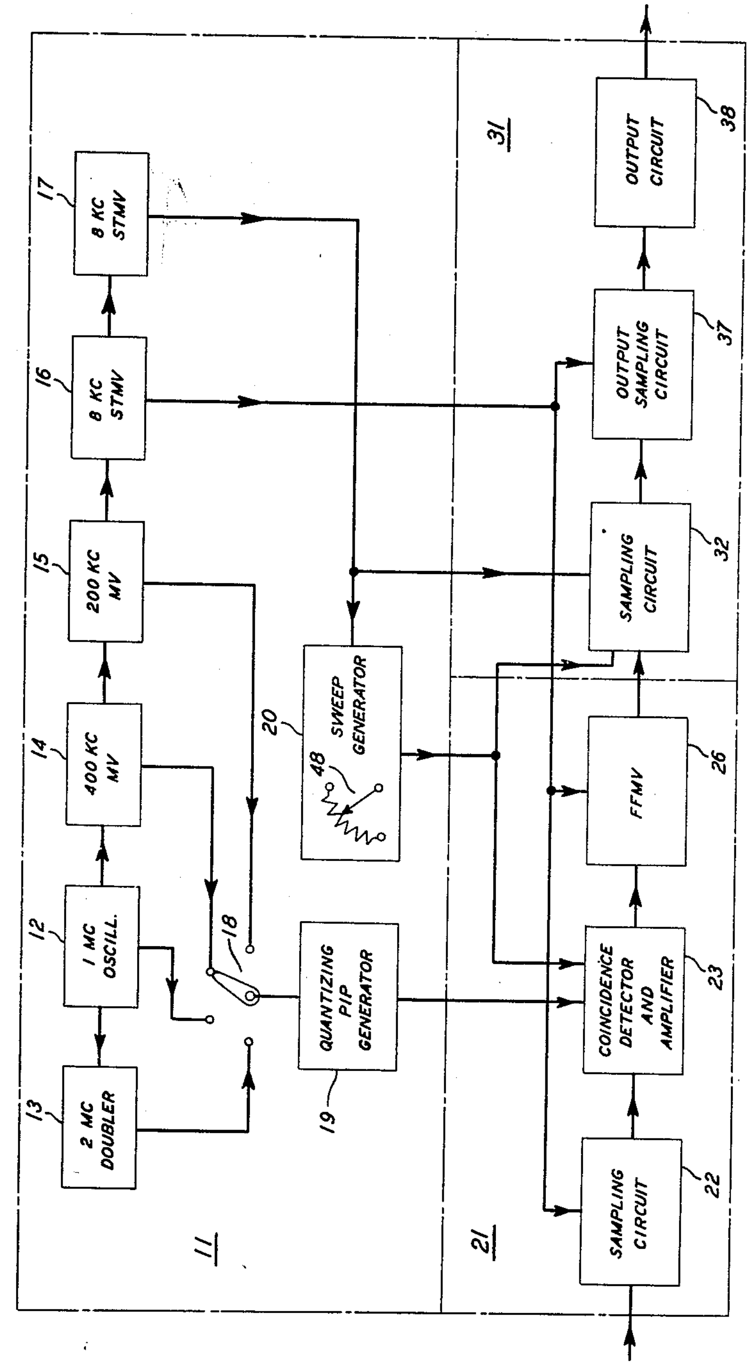
Fig. 1 shows in block diagram form a circuit embodying principles of the invention.

For the purpose of illustration the invention will be described as relating to a device adapted for the study of the effects of quantizing and instantaneous compression on a given input signal. Such a device, which will be designated a signal quantizer, is illustrated in Fig. 1. It comprises principally a timing circuit 11, a pulse modulator and quantizer 21 and a demodulator 31.

The basic control of the timing circuit 11 is the 1-megacycle oscillator 12 from which are derived all other controlling frequencies of the desired wave shape. The 2-megacycle output is derived from the oscillator 12 by the use of a conventional doubler 13 while the 400, 200 and 8-kilocycle outputs are generated therefrom by means of step-down multivibrators 14, 15, 16 and 17, respectively. The 8-kilocycle single trip multivibrators 16 and 17 control the sweep generator and the various clamps. Any of the higher frequencies may be selected by means of a selector switch 18 to be used in the generation of quantizing pips by the pip generator 19.

Figure 2:
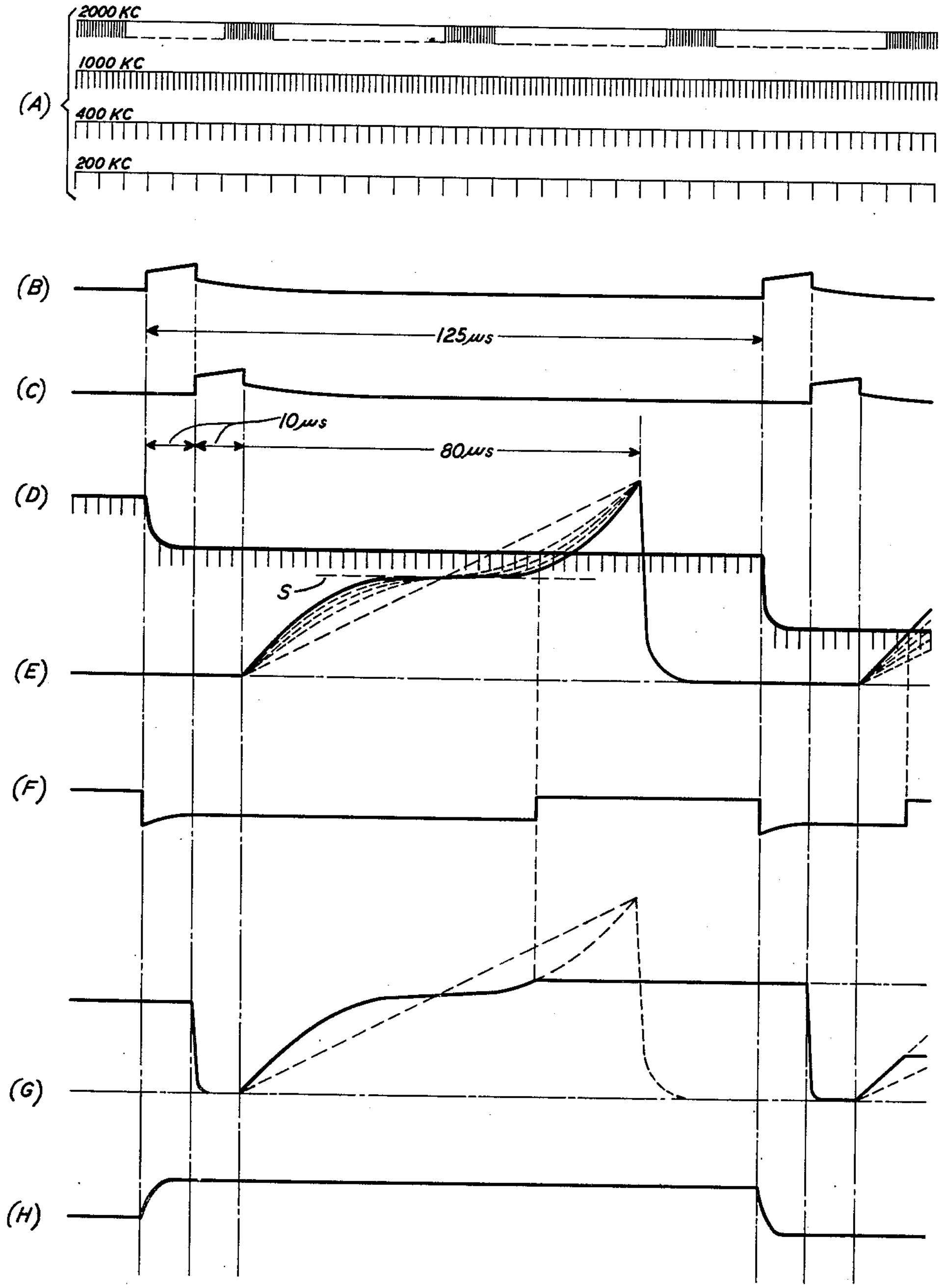
Fig. 2 illustrates wave forms appearing in the device of Fig. 1.

With particular reference now to Fig. 2, the various possible outputs of the pip generator 19 are illustrated at A. The outputs of the 8-kilocycle single trip multivibrators 16 and 17 are shown, respectively as wave forms B and C. These pulses are each 10 microseconds in duration and occur at a repetition rate of 8 kilocycles, or at 125-microsecond intervals, with the return to normal of the multivibrator 16 initiating a pulse from the multivibrator 17.

Figure 3A:
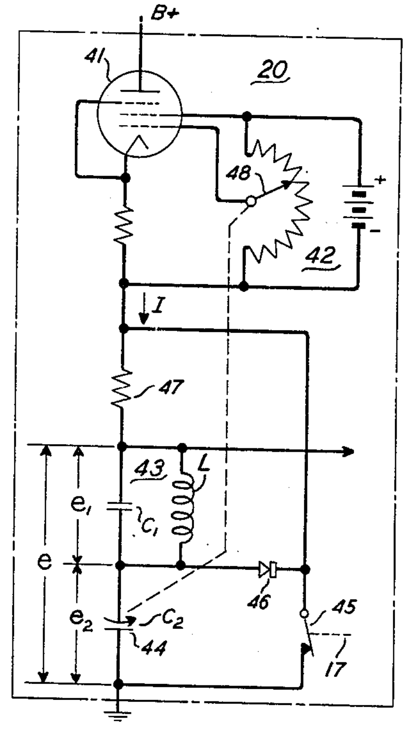
Fig. 3A shows schematically a simplified sweep circuit which may be incorporated in the device of Fig. 1.
Figure 3B:
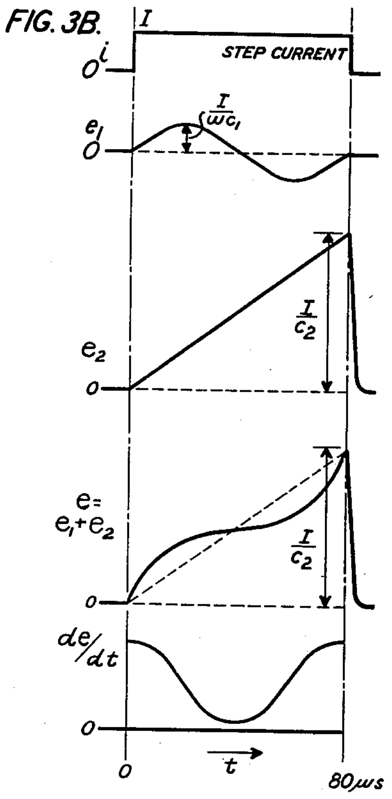
Fig. 3B illustrates wave forms descriptive of the sweep generator of Fig. 3A.

The non-linear sweep by which an input signal is instantaneously compressed is formed by the sweep generator 20. The start of the sweep is controlled by the output of multivibrator 17, wave form C. The sweep duration is determined by a single trip multivibrator located within the sweep generator circuit. The duration of the sweep is adjustable over a range of values with a nominal value for the purpose of illustration of 80 microseconds. The means by which the sweep is generated may be better understood by referring to an exemplary circuit shown in Fig. 3A and the wave shape illustrative thereof as shown in Fig. 3B.

A constant current generator, illustrated as a pentode 41 with an adjustable source of grid bias 42, supplies a regulated current I to a resonant circuit 43 and a variable condenser 44 bypassed by an electronic switch 45. A rectifier or diode 46 and a resistor 47 are also provided in order to quench oscillation of the resonant circuit 43 at a proper time, as will be described. If at a time $t_0$ the electronic switch 45 is opened (by the multivibrator 17) a stepped current of magnitude I will be supplied to the reactive elements. The voltage $e_1$ across the resonant circuit 43 will be a sine wave of the expression $$e_1=\frac{I}{\omega C_1}\sin \omega t$$

where $$\omega=\frac{1}{\sqrt{LC_1}}$$

The voltage $e_2$ across the condenser 44 will comprise a linearly increasing wave of the form $$e_2=\frac{It}{C_2}$$

The output of the sweep generator 20 comprises the sum of these two voltages and is represented by the expression:

$$e=e_1+e_2=I\left(\frac{\sin \omega t}{\omega C_1}+\frac{t}{C_2}\right)$$

The resistor 47 is preferably made large enough so that when the current I flows through it the resulting IR drop is greater than the amplitude $$\left(\frac{I}{\omega C_1}\right)$$

of $e_1$. This voltage acts to bias the diode 46 in the non-conducting direction throughout a complete cycle of $e_1$, and thus prevents the diode from affecting the oscillation of the resonant circuit 43.

At the end of one cycle of $e_1$, the electronic switch 45 is closed by the multivibrator 17. This closure performs three functions: (1) it provides a bypass to ground for the current I, interrupting its flow through the reactive elements; (2) it rapidly discharges condenser $C_2$ through the diode 46; and, (3) while the diode is thus conducting in the forward or low impedance direction, it effectively connects resistor 47 in parallel with the resonant circuit 43, thus quickly damping all traces of oscillation remaining therein. The circuit is thus left quiescent in readiness for the next cycle of operation.

It is essential that the period of $e_1$ be constant, 80 microseconds in the present illustration, and it is desirable that the amplitude of $e_1$ have several fixed values that can be selected at will to effect different degrees of compression. These conditions are accomplished in the illustrated embodiment of the invention in the following manner. The period of $e_1$ is maintained constant by making the inductance L and capacitance $C_1$ of the tuned circuit 43 constant. The amplitude is varied by changing the value of the current I supplied to the circuit by operating the potentiometer 48, which varies the fixed bias of the constant current pentode 41.

It is also necessary that the slope and amplitude of $e_2$ be constant; this is accomplished by holding the ratio of $$\frac{I}{C_2}$$

constant. To achieve this, the moving element of potentiometer 48 is mechanically coupled to the condenser 44 and varies the value of the capacitance $C_2$ so as to maintain a constant ratio of $$\frac{I}{C_2}$$

By means of the common control of potentiometer 48 and condenser 44, therefore, any one of a family of sweep voltages and hence compression characteristics may be selected. A representative output of the sweep generator 20 is illustrated as the solid wave form E in Fig. 2, its voltage ordinate being common with that of wave form D; the dotted curves represent lesser degrees of compression.

Referring again to Figs. 1 and 2, the quantizing action of the circuit is accomplished in the following manner. The input signal is combined with a direct-current bias of such a value that the resultant voltage is always positive. This positive voltage is then sampled at an 8-kilocycle rate under control of the output of the multivibrator 16. Each sample is stored, for example, as a charge on a condenser and held for the 125-microsecond multivibrator repetition period at which time a new sample is taken. This action is accomplished in a well-known manner by the circuit 22 and gives a stepped wave form, shown at D, Fig. 2. The stepped succession of samples is applied to the coincidence detector 23 along with the output of the pip generator 19 and the sweep voltage of the generator 20.

Figure 4:
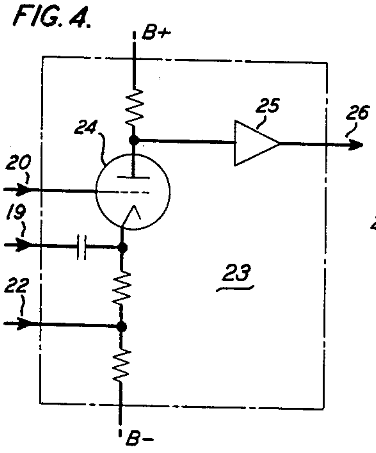
Fig. 4 illustrates schematically a coincidence detector which may be incorporated in the device of Fig. 1.

A coincidence detector of the type that may be employed is shown in Fig. 4. The sweep voltage from the generator 20 is applied to the control grid of a triode 24 while the positive input sample from the circuit 22 is applied to the cathode. (The output of the pip generator 19, also supplied to the cathode, will temporarily be disregarded.) At the beginning of a cycle, with the sweep at its starting and most negative point, the positive held value of the signal on the cathode keeps the cathode positive with respect to the grid. The tube is thus maintained in its cut-off condition and no current will flow. As the sweep drives the grid more positive a point is reached where the tube begins to conduct. When this occurs, the current flow causes a voltage drop across the plate resistor. This voltage change is amplified by an amplifier 25 and used to trip the flip-flop multivibrator 26 shown in Fig. 1. The point at which the multivibrator is tripped may be called the coincidence point and its position (at the intersection of wave forms D and E) depends upon the amplitude of the sample voltage which is supplied to the cathode, the sweep wave form and amplitude being constant. The variation of the sample voltage represents the variations of the signal voltage and hence variation of the coincidence point is a function of the input signal amplitude.

The flip-flop multivibrator 26, which has been tripped by the voltage representative of the coincidence point, is returned to its normal position at the end of the sweep interval by the multivibrator 16. The output of the multivibrator 26, wave form F, therefore represents a length-modulated pulse with the pulse length being some function of input signal amplitude depending on the amount of compression supplied by the curved sweep.

If the negative pips of sufficient amplitude are applied to the cathode of tube 24 in Fig. 4 along with the held value of the input sample, the coincidence point will always coincide with the occurrence of one of these pips. The coincidence point will thus be limited to a pip position and will occur at a pip ahead of the point of actual coincidence. Accordingly, these pips are the means of quantizing the input signal.

The number of quantized levels in the output is determined by the number of pips in the sweep intervals. For example, if the pips are produced at a 2-megacycle rate they occur at 0.5-microsecond intervals, $\Delta t$. If the sweep duration is 80 microseconds the number of available levels is 160. For the 200-kilocycle pip rate, $\Delta t$ equals 5 microseconds, and the number of discrete levels is only 16. An increase in the pip repetition rate therefore increases the number of quantizing levels afforded to the input signal. And, as previously mentioned, the larger the number of quantizing levels, the smaller will be the quantizing distortion.

As previously explained, it is desirable to devote a greater relative proportion of the total number of quantized levels to the smaller signaling amplitudes. A more satisfactory signal-to-noise ratio is thus maintained over the entire signal range. This is accomplished by means of the curved sweep. By properly biasing the input signal, the signal waves may be made to vary about an axis which coincides with the axis of symmetry S of the curved sweep E. The signal is thus instantaneously compressed, since the curved sweep expands the time range of coincidence points reserved for small signal amplitudes at the expense of the periods reserved for large ones.

The amplitude change, $\Delta e$, between adjacent quantizing levels, that is, $\Delta e$ for a particular time interval $\Delta t$, depends upon the slope of the sweep. The compression ratio is defined as the ratio of the maximum to minimum values of $\Delta e$ over the sweep intervals and may be shown to equal $$\frac{C1+C2}{C1-C2}$$

The compression ratio of the quantization is thus a function of the capacitances C1 and C2. It can be seen from the curve of $$\frac{de}{dt}$$

in Fig. 3B that by the use of a curved sweep $\Delta e$, for a given value of the pip period $\Delta t$, has been made very small in the region over which the signal level is low.

The demodulating circuit 31 is used to reproduce the input signal in a quantized form. By means of the sampling circuit 32 a sample of the sweep voltage E (or of a slightly delayed replica thereof) is taken at the time marked by the leading edge of the length-modulated pulse F formed by the multivibrator 26. The amplitude of this sample represents, on a quantized scale, the amplitude of the input signal sample. This action may be better understood by reference to Fig. 5.

Figure 5:
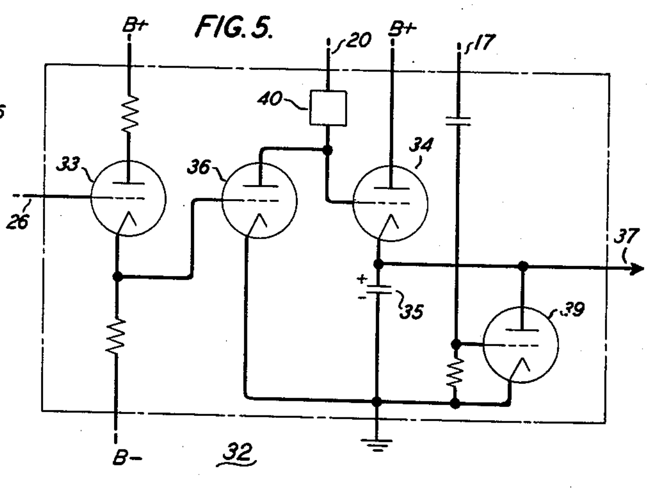
Fig. 5 illustrates schematically a portion of the demodulator of Fig. 1.

The length-modulated pulse F of the flip-flop multivibrator 26 is impressed on the grid of a triode 33 which is operated as a cathode follower. The cathode of triode 33 is connected to the grid of triode 36, and is normally at such a potential that triode 36 does not conduct. The sweep voltage from the sweep generator 20 is impressed by way of a delay element 40 on the grid of a triode 34, causing the condenser 35 to be charged as shown by wave form G and with a polarity as indicated in Fig. 5. The occurrence of the pulse F on the grid of tube 33 causes tube 36 to conduct, and this in turn drives the grid of tube 34 negative and beyond cut-off. The condenser 35, therefore, is charged in accordance with the sweep voltage only until a pulse F cuts off the flow of plate current in the tube 34. The small delay of the element 40 is preferably adjusted to be equal to the operating time of the coincidence detector 23, the flip-flop multivibrator 26, and the sampling circuit 32, thus compensating for their total delay. Accordingly, the charge established on the condenser 35 represents the quantized amplitude of the input wave sample.

In order to standardize the timing of the corresponding output samples, this charge is again sampled and held by the output sampling circuit 37 under control of the single trip multivibrator 16 and from there is fed through a cathode follower stage to an output circuit 38. The voltage produced by the output sampler 37 is shown by wave form H. The condenser 35 in Fig. 5 holds its charge as shown by wave form G until a pulse from the multivibrator 17 carries the grid of the triode 39 positive and allows the condenser to discharge therethrough. It may be noted that the condenser 35 is not dicharged until immediately after the operation of the final sampling circuit 37. The sampler 37 holds its charge during the entire 125-microsecond interval between the pulses of the multivibrator 16. If desired, a low-pass filter may be included in the output circuit 38 to eliminate frequency components lying above the band of the original input wave signal.

The output of the demodulator circuit 31 may be analyzed and studied to determine the effects of various degrees of quantization and compression on the input wave signal. As previously described the degree of quantizing may be varied by the switch 18 and the degree of compression may be varied by operating the potentiometer 48.

It may be noted by reference to the wave forms of Fig. 2 that the coincidence point of the signal quantizer represents a position modulation. The position of the pulse in the 80-microsecond interval of the sweep characteristic is determined by the signal amplitude. Also, this pulse position is quantized so that if the coincidence action is caused to trip a single trip multivibrator the output is a quantized pulse position modulation. The output of the flip-flop multivibrator 26 shown as wave form F of Fig. 2 is a pulse whose length varies with the amplitude of the input signal. This too is quantized by the pips and represents a quantized pulse length or duration modulation. Any sample taken of the wave form H of Fig. 2 would be a quantized pulse amplitude modulation. Such a pulse could be converted into a pulse code modulation. It will be readily apparent that the methods of the invention may also be applied to means for transmitting and receiving signal waves as well as to a device for the study of degrees of compression and quantization as disclosed herein in detail. Other embodiments and modifications within the scope of the invention will also occur to one skilled in the art.

What is claimed is:

1. In a quantized pulse modulation system for the transmission of complex wave forms, said system having a plurality of tandem stages, means in a first stage to recurrently obtain samples of said wave form, means to produce pulses modulated in accordance with the magnitude of each of said samples comprising means in a second stage to quantize said modulation and means also in said second stage to instantaneously compress each of said samples.

2. Pulse modulation apparatus having a plurality of tandem operating stages comprising means to instantaneously compress a complex wave form, said means comprising means in a first stage for generating a wave form having a wave shape similar to the desired compression characteristic, means in a second stage for recurrently obtaining samples of said complex wave form and means in a third stage to progressively compare the magnitude of each of said samples with the instantaneous amplitude of said generated wave form, quantizing means comprising means in said third stage to limit the number of possible compressed values to a predetermined finite number, and means for producing pulses modulated in accordance with the results of said comparisons.

3. In a system for producing pulses modulated in accordance with a complex wave form, timing means, means under control of said timing means for recurrently sampling said complex wave form, means for compressing said samples comprising generator means under control of said timing means for generating a continuously varying wave form having a wave shape similar to the desired compression characteristic for each of said samples, means for comparing the magnitude of each of said samples with the instantaneous amplitude of its associated generated wave form and adapted to produce an electrical response when the instantaneous amplitude of said generated wave form shall be related to the magnitude of said sample in a predetermined ratio, pulse forming means, and means to modulate said pulses in accordance with the character of said electrical response.

4. Apparatus to produce pulses modulated in accordance with a complex wave form comprising means to recurrently obtain samples of said wave form, means for instantaneously compressing said samples comprising means for generating a wave form for each of said samples having a wave shape similar to the desired compression characteristic, means to progressively compare the instantaneous amplitude of said generated wave form with the magnitude of its associated sample, means to detect the existence of a predetermined ratio between the magnitude of said sample and said instantaneous amplitude and to produce an electrical variation therefrom, means to generate a train of recurrent pulses, quantizing means comprising means to inject said train of pulses into said detection means to cause said electrical variation to occur only at the time of occurrence of a pulse of said pulse train, and means to produce an output pulse having a leading and a trailing edge, the timing of one of said edges under control of means synchronized with said wave form generating means and the timing of the other of said edges under control of said electrical variations.

5. Apparatus to produce pulses modulated in accordance with a complex wave form comprising means to recurrently obtain samples of said wave form, means for instantaneously compressing said samples comprising means for generating a wave form for each of said samples having a wave shape similar to the desired compression characteristic, means to progressively compare the instantaneous amplitude of said generated wave form with the magnitude of its associated sample, means to detect the existence of a predetermined ratio between the magnitude of said sample and said instantaneous amplitude and to produce an electrical variation therefrom, means to generate a train of recurrent pulses, quantizing means comprising means to inject said train of pulses into said detection means to cause said electrical variation to occur only at the time of occurrence of a pulse of said pulse train, pulse forming means, and means to control the length of said pulse comprising means controlled by said electrical variation to initiate said pulse and means synchronized with said wave form generating means to terminate said pulse.

6. Apparatus to produce pulses modulated in accordance with a complex wave form comprising timing means, means under control of said timing means to recurrently obtain samples of said complex wave form, means to substantially simultaneously compress said samples and produce a quantized pulse modulated in accordance with the amplitude of said sample comprising means under control of said timing means to generate for each of said samples a complex wave form having a wave shape similar to the desired compression characteristic, means to compare the magnitude of each of said samples with the instantaneous amplitude of its associated generated wave form, means to detect the existence of a predetermined ratio between the magnitude of said sample and the instantaneous amplitude of said generated wave form and to produce an electric impulse therefrom, quantizing means to limit the production of said electrical impulses to a finite number of times predetermined by said quantizing means, pulse forming means, and means under control of said electric impulses to modulate said pulses.

7. In a pulse modulation system for the transmission of complex wave forms, means to recurrently obtain samples of said complex wave forms, means to instantaneously compress said samples, quantizing means comprising a source of recurrent pulses and means to apply said recurrent pulses to said compression means to limit the possible values of the compressed samples to a predetermined finite number and means to produce pulses modulated in accordance with the compressed samples.

8. Pulse modulation apparatus comprising means to instantaneously compress a complex wave form, said means comprising means for generating a wave form having a wave shape similar to the desired compression characteristic, means for recurrently obtaining samples of said complex wave form, means to progressively compare the magnitude of each of said samples with the instantaneous amplitude of said generated wave form, and means to obtain an indication of a predetermined relation between said generated wave form and said samples, quantizing means comprising a source of recurrent pulses and means to inject said recurrent pulses into said comparison means to advance the occurrence of each of said indications to the occurrence time of one of said pulses and means for producing pulses modulated in accordance with said indications.

LARNED A. MEACHAM.

REFERENCES CITED

The following references are of record in the file of this patent:

UNITED STATES PATENTS

| Number | Name | Date |
|---|---|---|
| 2,438,908 | Goodall | Apr. 6, 1948 |